United States Patent [19]

Reed

[11] Patent Number: 4,674,365

[45] Date of Patent: Jun. 23, 1987

[54] METHOD FOR EXTENDING THE LIFE OF A CUTTING TOOL

[75] Inventor: James L. Reed, Grand Rapids, Mich.

[73] Assignee: Spectra Products Corporation, Grand Haven, Mich.

[21] Appl. No.: 517,673

[22] Filed: Jul. 27, 1983

[51] Int. Cl.⁴ ............................................... B21K 5/00
[52] U.S. Cl. ............................. 76/101 R; 76/108 R; 29/90 A
[58] Field of Search ................ 76/101 R, 101 A, 112, 76/108 R; 29/90 A

[56] References Cited

U.S. PATENT DOCUMENTS

| | | |
|---|---|---|
| 2,542,955 | 2/1951 | Young et al. |
| 3,073,022 | 1/1963 | Bush et al. |
| 3,078,546 | 2/1963 | Kiernan |
| 3,152,385 | 10/1964 | Wheildon, Jr. et al. |
| 3,211,199 | 10/1965 | Reed, II |
| 3,573,023 | 3/1971 | Thomas et al. |
| 3,820,419 | 6/1974 | McLagan |
| 3,903,761 | 9/1975 | Runton |
| 4,187,891 | 2/1980 | Weill |

*Primary Examiner*—Roscoe V. Parker
*Attorney, Agent, or Firm*—John A. Waters

[57] ABSTRACT

A method for extending the life of a cutting tool includes shot peening the surface of the tool, including all cutting edges thereof, with substantially spherical shot peening media of glass beads. Maximum life extension is achieved by optimizing the parameters of the peening process, including the Almen intensity and the shot size and uniformity. Cutting tools, especially steel tools, shot peened in accordance with the present method display many-fold increases in life.

5 Claims, No Drawings

METHOD FOR EXTENDING THE LIFE OF A CUTTING TOOL

BACKGROUND OF THE INVENTION

1. Field of the Invention

The present invention relates to cutting tools, and more particularly, to a method for extending the life of cutting tools having one or more cutting edges through shot peening.

2. Description of the Prior Art

Cutting tools are a necessary staple of the vast majority of manufacturing and repair facilities in operation today. While cutting tools, in the broadest sense, encompass such devices as grinding wheels, gas torch cutters, laser beam cutters and the like, the present invention is directed toward cutting tools that have one or more cutting edges, especially those that are designed for use in machines such as drills, drill presses, mills, lathes and the like. Representative examples of such cutting tools include drill bits, taps, mill cutters, broaches, turning cutters, form cutters and the like.

The important characteristic which is common to all of these cutting tools is that their cutting edges must be sharp and must be maintained sharp in order to satisfactorily function in their designed application. As the cutting edges begin to dull, a variety of problems evolve. For example, a sequence of smooth cuts is gradually replaced with jagged and scored surfaced cuts. Dullness increases the friction forces between the tool and the workpiece, increasing the strain on the cutting machine, as well as increasing the heat of both the cutting tool and the workpiece, both of which become increasingly more susceptible to breakage. As the cutting chips and shavings become more irregular, jams and sticking of the tool increases. The combination of the increased torque forces and the work hardening brittleness to which a dull cutting tool is exposed will quickly lead to complete tool failure. Scratches on a dull cutting tool turn into cracks and eventual complete tool failure. Finally, as the cutting tool dulls, the quality of the workpiece decreases, since dimensional tolerances become increasingly difficult to hold.

Because of the expense and poor quality resulting from the above problems, a constant vigilence is required to maintain the cutting edges of cutting tools sharp. Typically, as the cutting tool begins to dull, it is removed and precision ground to restore sharp cutting edges. While this is a costly operation, including either machine down time or the expense of an inventory of backup tools to minimize machine down time, it is less costly than poor quality workpieces and the replacement of expensive broken cutting tools. Consequently, extending the life of cutting tools, including the time between required resharpening operations, is an ever-present goal. Although modern technology has provided improved alloys for high speed and tool steel cutting tools, further improvement, especially at low cost, would be of significant value.

SUMMARY OF THE INVENTION

According to the present invention, there is provided a method for extending the life of cutting tools having one or more cutting edges which is simple, reliable, economical, which reduces tool breakage and improves workpiece quality, and which results in the cutting tools having lives many times the lives of existing tools, including the life between required resharpenings. The method comprises shot peening the surface of the cutting tool, including all cutting edges thereof, with substantially spherical shot peening media which comprises glass beads. Optimum results have been achieved with steel cutting tools.

The preferred shot peening media of glass beads has a Mil Spec size of from about G-9954A 3 to about G-9954A 13, and the peening is preferably conducted at an Almen intensity of from about 0.002 to about 0.010 A2.

Cutting tools shot peened in accordance with the method of the present invention uniformly exhibit lives on the order of from about 2 to over 20 times the lives of identical but unpeened tools, including the life between required resharpening.

DESCRIPTION OF THE PREFERRED EMBODIMENTS

The present invention was the result of the surprising discovery that shot peening with generally spherical shot of glass beads dramatically extends the life of cutting tools with no adverse effect on the sharpness or uniformity of the cutting edges. It was discovered that although the cutting edges of the peened tools were initially slightly less sharp than the cutting edges of identical unpeened tools, after only a few cutting operation cycles, this status was reversed as the unpeened tool cutting edges dulled much more quickly. Heretofore, cutting tool manufacturers and the resharpening machinists would strive to provide as smooth and regular a surface on the cutting edges as possible. Although shot peening has been in widespread use for years to increase the fatigue life and prevent stress corrosion cracking of metal parts, a peened surface on the cutting edge of a cutting tool would be unthinkable, since it would be contrary to the accepted goal of achieving as smooth and regular a surface on the cutting edge as possible.

In performing the method of the present invention, conventional shot peening techniques and equipment are utilized, i.e., the surface of the tool, including the cutting edges, is bombarded with shot by a peening apparatus under controlled conditions. However, in the preferred embodiments, optimum results are achieved by utilizing specific sizes of the glass beads and specific Almen peening intensities. The preferred peening apparatus includes air blasting equipment which propel the shot media at the part under air pressure, utilizing either suction, direct pressure or gravity feed. Either wet or dry peening procedures may be utilized.

With respect to the shot peening media, the use of substantially spherical glass beads is critical to the success of the method of the present invention and the dramatic improvement to the life of the cutting tools. Irregular angular or abrasive media, such as employed in grit blasting, are totally unacceptable in the method of the present invention. Even generally spherical peening media other than glass beads, such as steel shot, are unsatisfactory. In the preferred embodiment, the glass beads have a Mil Spec size of from about G-9954A 3 to about G-9954A 13. Substantially larger beads tend to damage the cutting edges, while substantially smaller beads do not consistently provide significant improvement to tool life. Within the above range, the specific size election should be based on the size of any tool crevices or the spacing between cutting edges on multiple edged tools, such as taps and the like, to insure that the peening will reach all surfaces and not become trapped or lodged in the tool.

The peening process should be conducted under conditions that will yield substantially 100% coverage and saturation of the cutting tool surface. Under the generally accepted Almen shot peening intensity standard, which was developed by the General Motors Research Laboratories Division of General Motors Corporation, the various variables of shot peening are integrated into a single scale for measuring, specifying and duplicating shot peening intensities and results. All measurements are made on the standard Almen No. 2 gage, as shown in the SAE Manual on Shot Peening, AMS 2430 and MIL S-13165. In the present invention, when peening with glass beads in the above preferred size range, optimum results have been achieved with an Almen intensity of from about 0.002 to about 0.010 A2.

The method of the present invention has produced consistent improvement in life on a wide variety of cutting tools, such as taps, drill bits, broaches, cutting mills, shaper cutters, various turning and form tools and the like. The method has been especially effective on steel tools. A side by side comparison of cutting tools shot peened in accordance with the method of the present invention and identical but unpeened tools in the same cutting operation and equipment, on identical workpieces, dramatically demonstrates the value of the present method. In virtually every such test, the improvement in longevity of the peened tools is manyfold, ranging from a factor of about 2 to over 20.

The substantial and consistent increase in life of cutting tools peened according to the method of the present invention, which is simple and economical to perform, represents a significant contribution to the tool industry. In addition, the method and the peened tools also demonstrate a variety of other improvements and advantages. For example, the method is not limited to any particular physical size or configuration of cutting tool. Not only do the peened tools require less frequent resharpening than unpeened tools, in most cases the resharpening of the peened tools requires significantly less material removal than required with the unpeened tools, thereby adding to the longevity of peened tools. Under magnification, the peened surface of the tools has an "orange peel" like appearance. Since most machine operated cutting operations maintain coolant on the tool cutting edge, which is difficult with the conventional smooth tools, the shallow indentations of the peened tools act as small coolant reservoirs and thereby keep the cutting tool at a lower temperature with less galling, scoring and work hardening.

Another improvement of the peened tools is that peening provides a compressive stress layer at the surface, which reduces fatigue and cracking failures which are common in the case of the tensile stress surface of unpeened tools. Small scratches and cracks on the surface are less frequent, and, when they do occur, the compressive stress surface layer of the peened tools resists growth and inward propagation of the cracks.

Finally, when the economies of the low cost method of the present invention are combined with the substantial savings in resharpening and breakage down time and tool replacement costs, because of the extended life and superior properties of the peened tools, it is clear that the method and peened tools of the present invention represent a substantial advance in the cutting tool industry.

While the preferred embodiments of the present invention have been described and set forth, it will be obvious to those skilled in the art that various changes and modifications can be made without departing from the spirit of the present invention. Accordingly, the scope of the present invention is deemed to be limited only by the following appended claims.

The embodiments of the present invention in which an exclusive property or privilege is claimed are defined as follows:

1. A method for extending the life of a steel cutting tool having one or more cutting edges previously formed thereon comprising shot peening the surface of said tool and the cutting edges thereof with substantially spherical shot peening media which comprises glass beads.

2. The method according to claim 1 wherein said glass beads have a Mil Spec size of from about G-9954A 3 to about G-9954A 13.

3. The method according to claim 2 wherein said shot peening is conducted at an Almen intensity of from about 0.002 to about 0.010 A2.

4. A cutting tool having one or more cutting edges which is shot peened in accordance with claim 1, 2 or 3.

5. A method for extending the life of a steal cutting tool that has already had one or more cutting edges formed thereon comprising shot peening the tool and its cutting edges with substantially spherical glass beads having a Mil Spec size of about G-9954A 3 to about G-9954-A 13 at an Almen intensity of about 0.002 to about 0.012 A2.

* * * * *